(12) United States Patent
Yoo

(10) Patent No.: US 6,979,128 B2
(45) Date of Patent: Dec. 27, 2005

(54) SPINDLE MOTOR FOR HARD DISC DRIVE

(75) Inventor: Yong-chul Yoo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 133 days.

(21) Appl. No.: 10/693,945

(22) Filed: Oct. 28, 2003

(65) Prior Publication Data

US 2004/0190195 A1  Sep. 30, 2004

(30) Foreign Application Priority Data

Nov. 19, 2002  (KR) ................. 10-2002-0071965

(51) Int. Cl.⁷ ............................................. F16C 32/06
(52) U.S. Cl. ..................................... 384/100; 384/107
(58) Field of Search ............................... 384/100, 107, 384/114, 121; 184/6.23

(56) References Cited

U.S. PATENT DOCUMENTS

| 3,749,954 A | * | 7/1973 | Anderson, Jr. ............... 310/90 |
| 5,018,881 A | * | 5/1991 | Asada ......................... 384/113 |
| 5,715,116 A | * | 2/1998 | Moritan et al. ............. 384/107 |
| 6,147,424 A | * | 11/2000 | Gomyo et al. ............. 384/113 |

FOREIGN PATENT DOCUMENTS

| JP | 11-117935 | 4/1999 |
| JP | 2002-106567 | 4/2002 |

* cited by examiner

Primary Examiner—Thomas R. Hannon
(74) Attorney, Agent, or Firm—Staas & Halsey LLP

(57) ABSTRACT

A spindle motor for a hard disc drive. The spindle motor includes an oil outflow prevention part mounted at an inner side of an oil inlet, preventing oil from flowing out through the oil inlet, but allowing an outflow of air bubbles that are generated due to gasification of the oil. Accordingly, the contamination of the spindle motor due to oil that has flowed out is decreased.

20 Claims, 3 Drawing Sheets

SPINDLE MOTOR FOR HARD DISC DRIVE

CROSS-REFERENCE TO RELATED APPLICATIONS

This application claims the benefit of Korean Patent Application No. 2002-71965, filed Nov. 19, 2002, in the Korean Intellectual Property Office, the disclosure of which is incorporated herein by reference.

BACKGROUND OF THE INVENTION

1. Field of the Invention

The present invention relates to a spindle motor for a hard disc drive, and particularly, to a spindle motor for a hard disc drive having an oil outflow prevention apparatus preventing outflow of oil from a fluid dynamic bearing used in the spindle motor.

2. Description of the Related Art

In general, a spindle motor, used in a hard disc drive, having a large capacity and a high rotational speed, utilizes a fluid dynamic bearing having less driving friction than a ball bearing for reducing noise and non-repeatable run-out (NRRO) in the hard disc drive. The fluid dynamic bearing forms an oil film between a rotating member and a fixed member, and is able to support the rotating member with pressure generated during rotation. Accordingly, the rotating member and the fixed member can be kept from direct contact, and frictional resistances can be reduced. In order to effectively generate a required pressure to form the oil film, a groove, used in generating dynamic pressure, is formed, e.g., in a spiral pattern, on the rotating member and at least one side of the fixed member.

Accordingly, a radial bearing having a groove used in generating dynamic pressure is formed on a circumferential surface so that oil in bearing clearances, with respect to a sleeve, can support a load in the radial direction of the shaft with the dynamic pressure generated by the groove. Further, a thrust bearing, having grooves used in generating dynamic pressure, is formed on upper and lower surfaces of a thrust plate so that oil in bearing clearances, with respect to a shaft and a sleeve, can support a load in the axial direction of the shaft. The dynamic pressure generated by the grooves facilitates stable operations.

FIG. 1 is a side, cross-sectional view of a conventional spindle motor having a radial bearing, as well as a thrust bearing, to support loads in the radial and axial directions of a shaft thereof.

Referring to FIG. 1, bearing clearances are provided between a shaft 150 and a sleeve 130 of a spindle motor 100. Grooves 131, used in generating dynamic pressure, are formed at upper and lower sections of the inner circumferential surface of the sleeve 130.

A base 110 is positioned at a lower section of the shaft 150, and a thrust plate 151 and a thrust flange 153 are mounted on the base 110. Although not shown in FIG. 1, grooves (not shown) used in generating dynamic pressure between the thrust plate 151, the thrust flange 153, and the sleeve 130 are also provided.

The bearing clearances are provided to form a path between the sleeve 130, the outer circumferential surface of the shaft 150, the thrust plate 151, and the thrust flange 153.

An oil inlet 160 is provided at one side of the sleeve 130 through the outer circumferential surface to the inner circumferential surface thereof. The oil inlet 160 is also provided at the base 110 adjacent to the side of the flange 153.

Oil, provided through the oil inlet 160, is filled into the bearing clearances to support the shaft 150, with the pressure generated by the grooves, when the shaft 150 is rotated.

In the conventional hard disc drive spindle motor, having a structure as described above, as the shaft is rotated, the oil is subject to heat generated by friction. As temperature increases, due to frictional heat generated in the bearing clearances, the air bubbles in the oil, provided into the bearing clearances, are thermally expanded. Consequently, a problem occurs in that non-repeatable run-out (NRRO) critical to driving characteristics, driving resistances, and consumption power increases. Therefore, a separate vent is formed, or the oil inlet as shown in FIG. 1, is used to eliminate the air bubbles from the bearing clearances.

FIG. 2 shows a state in which the oil flows out from the conventional spindle motor shown in FIG. 1. Referring to FIG. 2, as the air bubbles flow out through the oil inlet 160, the oil also flows out from the bearing clearances. The oil, that has flowed out, contaminates the inside of the spindle motor. Further, as the oil has flowed out, a deficiency of oil in the bearing clearances occurs. Accordingly, abrasion of frictional members is accelerated and their life cycles are reduced, or in a severe case, the spindle motor cannot be driven.

In addition, fine metal particles, produced during the assembly of the frictional members, can be mixed with the oil in the bearing clearances. The metal particles can cause damage to the frictional surface of the shaft, or obstruct the driving of the motor as they flow out with the oil.

SUMMARY OF THE INVENTION

The present invention provides a spindle motor for a hard disc drive including an oil outflow prevention apparatus preventing an outflow of oil, but allowing an outflow of air bubbles, from bearing clearances, when a shaft is rotated.

A hard disc drive, spindle motor, according to an aspect of the present invention includes a base, a thrust plate mounted on the base forming bearing clearances with respect to a shaft, and supporting the shaft in the thrust direction, a sleeve accommodating the shaft forming bearing clearances between the inner circumferential surface of the sleeve and the outer circumferential surface of the shaft, and supporting the shaft in the radial direction when the shaft is rotated. The motor also includes a starter core mounted at the outer side of the sleeve, and a hub to which the shaft is fixed, having an assembly of a yoke and a magnet provided at a position corresponding the starter core to produce electromagnetic forces through interactions with the starter core. An oil inlet is at one side of the sleeve through the outer circumferential surface to the inner circumferential surface of the sleeve, and through which oil is provided into the bearing clearances. An oil outflow prevention apparatus is mounted at an inner side of the oil inlet preventing the oil from flowing out through the oil inlet, but allowing outflow of air bubbles, generated due to gasification of the oil, while the shaft is rotated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent, and more readily appreciated, from the following description of the embodiments taken in conjunction with the accompanying drawings in which.

DETAILED DESCRIPTION OF THE INVENTION

Figure 1:
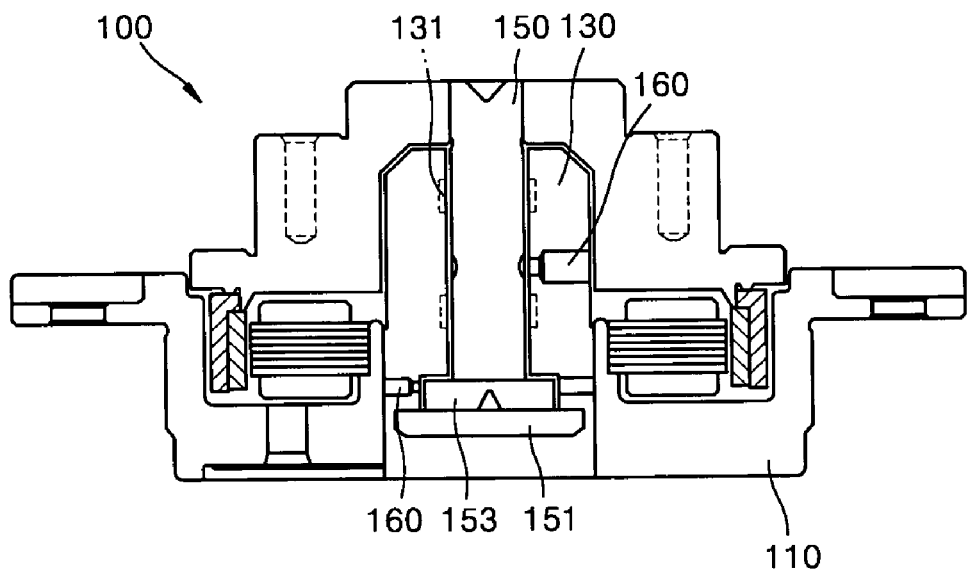
FIG. 1 is a side cross-sectional view of a conventional hard disc drive spindle motor.
Figure 2:
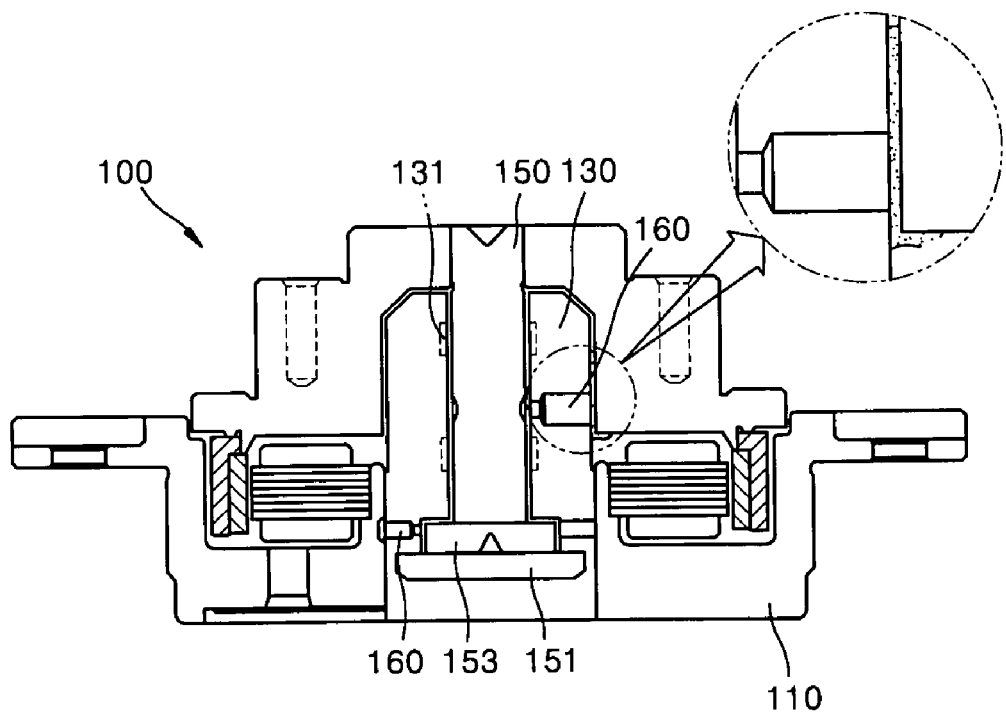
FIG. 2 shows a state in which oil has flowed out from the conventional spindle motor shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
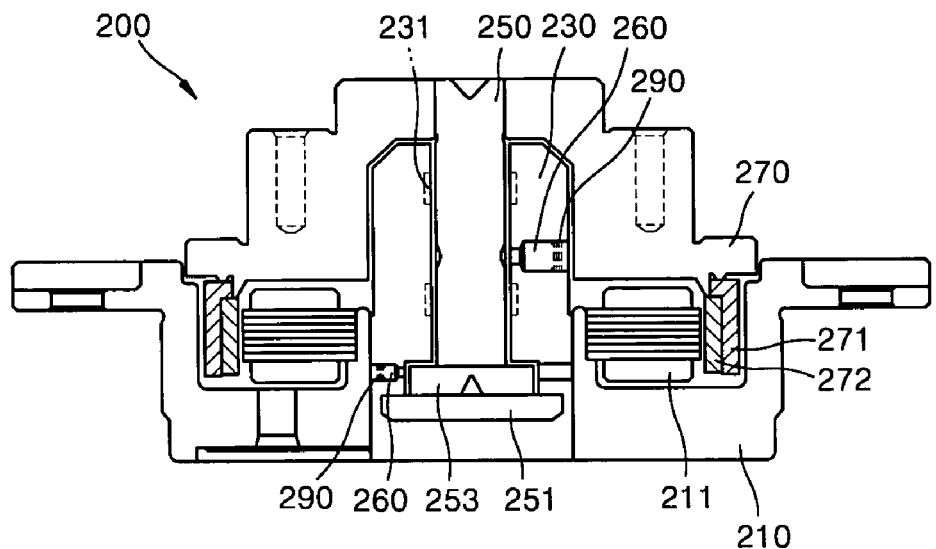
FIG. 3 is a side, cross-sectional view of a hard disc drive, spindle motor having an oil outflow prevention apparatus according to an aspect of the present invention.

Referring to FIG. 3, a hard disc drive, spindle motor 200, according to an aspect of the present invention, includes a base 210, a hub 270, and a shaft 250. The shaft 250 is rigidly fixed to the hub 270, and rotated in accordance with the rotation of the hub 270. A thrust plate 251 is mounted on the base 210, and a thrust flange 253 is mounted on the thrust plate 251. The thrust flange 253 is rigidly fixed into the lower side of the shaft 250.

A sleeve 230 is mounted above the thrust plate 251 and the thrust flange 253, and the shaft 250 is inserted into, and can be rotated in, the inner circumferential section of the sleeve 230. Bearing clearances are provided at the sections where the sleeve 230, the shaft 250, the thrust plate 251, and the thrust flange 253 contact each other.

Although not shown in FIG. 3, grooves are provided for generating dynamic pressure, e.g., in a spiral pattern, at a surface where the thrust plate 251 and the thrust flange 253 contact each other, and at a surface where the thrust flange 253 and the sleeve 230 contact each other. The grooves generate dynamic pressure, while the shaft is rotated, so that oil fills into the bearing clearances to support the shaft 250 in the axial direction.

Grooves 231 are also provided, for generating a dynamic pressure, at the upper and the lower sides of the inner circumferential section of the sleeve 230. While the shaft 250 is rotated, the grooves 231 generate dynamic pressure so that oil fills into the bearing clearances to support the shaft 250 in the radial direction.

The thrust plate 251, the thrust flange 253 and the sleeve 230, and the shaft 250 and the sleeve 230, form fluid dynamic bearings, and the grooves 231 generate dynamic pressure when the shaft 250 is rotated so that oil fills into the bearing clearances to support the shaft 250 in the radial direction.

A starter core 211 is mounted on the base 210, and at the outer side of the sleeve 230, and an assembly of a yoke 271 and a magnet 272 is provided at a position corresponding to the starter core 211 to produce electromagnetic forces through interaction with the starter core 211.

The starter core 211 and the assembly of the yoke 271 and the magnet 272 interact with each other, and produce electromagnetic forces. As the electromagnetic forces rotate the hub 270, the shaft 250, fixed to the hub 270, is also rotated.

An oil inlet 260 is at one side of the sleeve 230 through the outer circumferential surface to the inner circumferential surface of the sleeve 230. Another oil inlet 260 is also provided at the other side of the sleeve 230 facing the side surface of the thrust flange 253. Therefore, the bearing clearances are able to be filled with oil, provided from outside, through the oil inlets 260.

Figure 4:
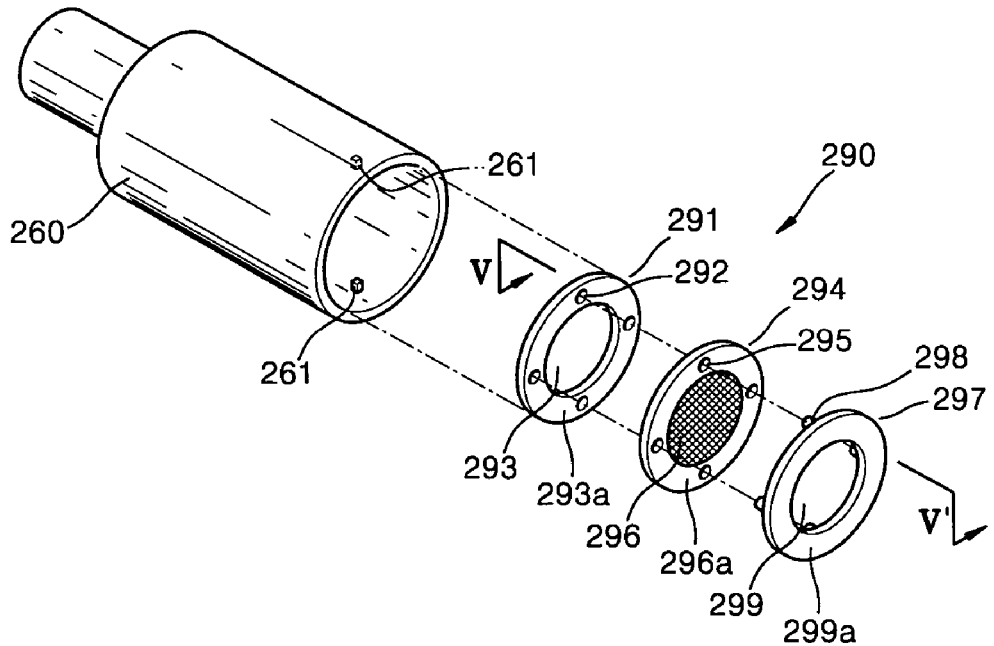
FIG. 4 is an exploded perspective view of an oil outflow prevention apparatus according to an aspect of the present invention.
Figure 5:
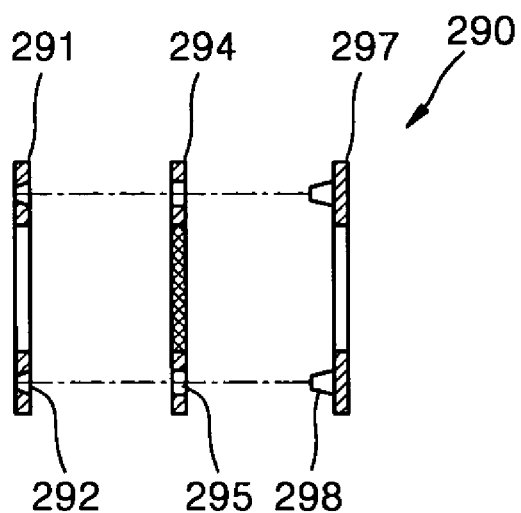
FIG. 5 is a cross-sectional view of the oil outflow prevention apparatus taken along line V–V' in FIG. 4.

An oil outflow prevention apparatus 290 is installed in the oil inlets 260. Referring to FIGS. 4 and 5, the oil outflow prevention apparatus 290 includes a locking member 291, a filtering member 294, and a fixing member 297.

The locking member 291 has a cylindrical shape, and a circular opening 293 is formed at the center of the locking member 291. A flange 293a is provided between the outer circumference of the opening 293 and the outer circumference of the locking member 291. A plurality of locking holes 292 are located in the flange 293a at predetermined intervals along the circumferential direction thereof. The locking holes 292 are cone-shaped, having tapers in the direction where the filtering member 294 and the fixing member 297 are engageable.

The filtering member 294 has a cylindrical shape, and a circular opening 296 is at the center of the filtering member 294. A flange 296a is provided between the outer circumference of the opening 296 and the outer circumference of the filtering member 294. A plurality of perforations 295 are located in the flange 296a at predetermined intervals along the circumferential direction thereof. According to an aspect of the invention, a membrane is mounted at the opening 296. The membrane passes air bubbles, but not oil. Therefore, during the rotation of the shaft 250, the outflow of the oil, filled in the bearings of the spindle motor, through the membrane can be prevented, while the air bubbles can flow out through the membrane.

The fixing member 297 has a cylindrical shape, and a circular opening 299 at the center of the fixing member 297. A flange 299a is provided between the outer circumference of the opening 299 and the outer circumference of the fixing member 297. A plurality of protrusions 298 are located on the flange 299a at predetermined intervals along the circumferential direction thereof. The protrusions 298 are cone-shaped having tapers, and insertable into the locking holes 292.

When the locking member 291, the filtering member 294, and the fixing member 297 are assembled, the protrusions 298 are inserted into the locking holes 292 through the perforations 295. The oil outflow prevention apparatus 290 assembly as described above is engageable with a projected hooking member 261 formed at the inner side of the oil inlet 260. While a pair of hooking members 261, symmetrically formed and placed are shown in FIG. 4, a varied number of hooking members 261 can be formed along the inner circumferential direction.

Figure 6:
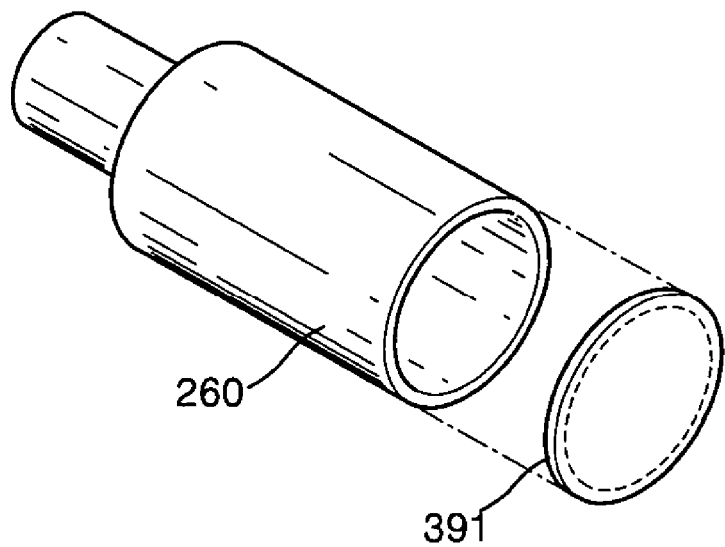
FIG. 6 is an exploded perspective view of an oil outflow prevention apparatus according to another preferred embodiment of the present invention.

Referring to FIG. 6, an oil outflow prevention apparatus according to an aspect of the present invention is shown including a membrane 391, attached at the entrance of the oil inlet 260 using adhesives. For attaching the membrane 391 at the entrance of the oil inlet 260, adhesives can be applied either to the edge of the membrane 391 or to the border of the entrance, or a double-sided adhesive tape can be used.

It is noted that the oil can be provided, through the oil inlet 260 into the bearing clearances, by making the bearing clearances vacuous with a predetermined device, or tool, and using a pressure difference. Thereafter, the oil outflow prevention apparatus 290 is installed in the oil inlet 260 to prevent outflow of the oil, through the oil inlet 260, when the shaft 250 is rotated.

As described above, in a hard disc drive, spindle motor according to an aspect of the present invention, the membrane installed in the entrance of the oil inlet can prevent outflow of oil from bearing clearances while allowing the outflow of air bubbles generated when a shaft is rotated, and therefore, the contamination of the spindle motor due to an outflow of oil can be effectively prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A spindle motor, with a shaft, for a hard disc drive, comprising:
    a base;
    a thrust plate mounted on the base forming bearing clearances with respect to the shaft, and supporting the shaft in a thrust direction;
    a sleeve accommodating the shaft, forming bearing clearances between an inner circumferential surface of the sleeve and an outer circumferential surface of the shaft, and supporting the shaft in a radial direction when the shaft is rotated;
    a starter core mounted at an outer side of the sleeve;
    a hub, to which the shaft is fixed, having an assembly of a yoke and a magnet at a position corresponding to the starter core producing electromagnetic forces through interactions with the starter core;
    an oil inlet at one side of the sleeve through an outer circumferential surface to the inner circumferential surface of the sleeve, and through which oil is provided into the bearing clearances; and
    an oil outflow prevention unit installed at an inner side of the oil inlet preventing the oil from flowing out through the oil inlet, but allowing an outflow of air bubbles generated due to gasification of the oil, while the shaft is rotated.

2. The spindle motor according to claim 1, wherein the oil outflow prevention unit includes a membrane mounted at the oil inlet.

3. The spindle motor according to claim 2, wherein the membrane is mounted to the oil inlet using adhesives.

4. The spindle motor according to claim 1, wherein the oil outflow prevention unit includes:
    a locking member having an opening at the center thereof, and a plurality of locking holes located along a circumferential direction thereof;
    a fixing member having an opening at the center thereof, and a plurality of protrusions located along a circumferential direction thereof, engageable with the plurality of locking holes; and
    a filtering member between the locking member and the fixing member, having a membrane provided at a center thereof, and a plurality of perforations along a circumferential directions thereof, through which the protrusions are passed,
wherein the locking member, the filtering member, and the fixing member are assembleable with each other, and the assembly is fixedly engageable with a hooking member provided at an inner side of the oil inlet.

5. The spindle motor according to claim 4, wherein the locking holes and the protrusions have cone-shaped cross sections.

6. The spindle motor according to claim 4, wherein the locking member has a cylindrical shape, and the opening at the center thereof is substantially circular.

7. The spindle motor according to claim 4, wherein the locking member is a flange.

8. The spindle motor according to claim 4, wherein the plurality of protrusions are located at predetermined intervals.

9. A spindle motor, with a shaft, for a hard disc drive, comprising:
    a base;
    a thrust plate mounted on the base, forming bearing clearances with respect to the shaft, and supporting the shaft in a thrust direction;
    a sleeve accommodating the shaft, forming bearing clearances between a inner circumferential surface of the sleeve and an outer circumferential surface of the shaft, and supporting the shaft in a radial direction when the shaft is rotated;
    an oil inlet through the sleeve and through which oil is provided into the bearing clearances; and
    an oil outflow prevention apparatus installed at an inner side of the oil inlet preventing the oil from flowing out through the oil inlet, but allowing an outflow of air bubbles generated due to gasification of the oil, while the shaft is rotated.

10. The spindle motor according to claim 9, wherein the oil outflow prevention apparatus includes a membrane mounted at the oil inlet.

11. The spindle motor according to claim 10, wherein the membrane is mounted at the oil inlet using an adhesive.

12. The spindle motor according to claim 9, wherein the oil outflow prevention apparatus includes:
    a locking member having an opening at a center thereof, and a plurality of locking holes formed along a circumferential direction thereof,
    a fixing member having an opening at the center thereof, and a plurality of protrusions formed along a circumferential direction thereof, engageable with the plurality of locking holes, and
    a filtering member between the locking member and the fixing member, having a membrane provided at the center thereof, and a plurality of perforations along circumferential directions thereof, through which the protrusions can be passed,
wherein the locking member, the filtering member, and the fixing member are assembleable with each other, and the assembly is fixedly engageable with a hooking member provided at the inner side of the oil inlet.

13. The spindle motor according to claim 12, wherein the locking holes and the protrusions have cone-shaped cross sections.

14. An oil outflow prevention apparatus for a spindle motor, having an oil inlet and a fluid dynamic bearing, comprising:
    a locking member having an opening at a center thereof, and a plurality of locking holes formed along a circumferential direction thereof;
    a fixing member having an opening at a center thereof, and a plurality of protrusions formed along a circumferential direction thereof, engageable with the plurality of locking holes, and
    a filtering member between the locking member and the fixing member, having a membrane provided at the center thereof, and a plurality of perforations along circumferential directions thereof, through which the protrusions are passable.

15. The oil outflow prevention apparatus according to claim 14, wherein the locking member, the filtering member, and the fixing member are assembleable with each other, and the assembly is fixedly engageable with a hooking member provided at an inner side of the oil inlet.

16. The oil outflow prevention apparatus according to claim 15, wherein the locking holes and the protrusions have cone-shaped cross sections.

17. An oil outflow prevention apparatus for a spindle motor with a shaft, having an oil inlet and a fluid dynamic bearing, comprising:
   a membrane installed at an inner side of the oil inlet, preventing the oil from flowing out through the oil inlet, but allowing an outflow of air bubbles generated due to gasification of the oil, while the shaft is rotated.

18. The oil outflow prevention apparatus according to claim 17, wherein the membrane is mounted to the oil inlet using an adhesive.

19. The oil outflow prevention apparatus according to claim 18, wherein the adhesive is applied to an edge of the membrane or applied to a border of an entrance of the oil inlet.

20. The oil outflow prevention apparatus according to claim 18, wherein the adhesive is a double-sided adhesive tape.

* * * * *